United States Patent Office 3,018,297
Patented Jan. 23, 1962

3,018,297
1,3- AND 1,4-BISOXYGENATED ESTRA-1,3,5(10)-TRIENES AND INTERMEDIATES
James Jiu, Morton Grove, Ill., assignor to G. D. Searle & Co., Chicago, Ill., a corporation of Delaware
No Drawing. Filed Feb. 29, 1960, Ser. No. 11,425
6 Claims. (Cl. 260—397.4)

The present invention is concerned with novel estratrienes lacking the characteristic oxygen-containing substituent at $C_{17}$, as represented by the 1,3- and 1,4-bisoxygenated estra-1,3,5(10)-trienes of the structural formulae

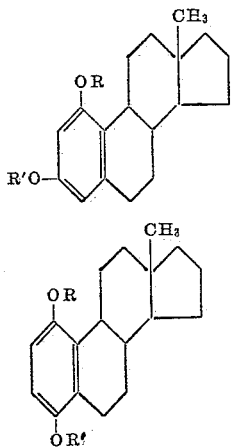

wherein R and R' are selected from the group consisting of hydrogen and lower alkanoyl radicals; and also with novel intermediates in the production thereof. The lower alkanoyl radicals designated by R and R' are, for example, formyl, acetyl, propionyl, butyryl, valeryl, caproyl, and the branched-chain isomers thereof.

A starting material suitable for the manufacture of the instant compounds is estra-1,3,5(10)-trien-3-ol. Treatment of this phenolic substance in acetic acid with lead tetraacetate affords 10β-acetoxyestra-1,4-dien-3-one. Reaction of the latter substance with acetic anhydride and concentrated sulfuric acid results in rearrangement to yield 1,3-diacetoxyestra-1,3,5(10)-triene. When the aforementioned 10β-acetoxyestra-1,4-dien-3-one is treated with saturated methanolic potassium bicarbonate at the reflux temperature, the instant 10β-hydroxyestra-1,4-dien-3-one is obtained. Treatment of this tertiary alcohol under the identical conditions used for rearrangement of its acetate, i.e. mixing with acetic anhydride and concentrated sulfuric acid, produces 1,4-diacetoxyestra-1,3,5(10)-triene.

The 1,3- and 1,4-diols of the present invention are obtained by hydrolysis of the corresponding diacetates, suitably with dilute hydrochloric acid in methanol at the reflux temperature. As a specific example, 1,4-diacetoxyestra-1,3,5(10)-triene in methanol is heated at reflux with dilute hydrochloric acid to afford estra-1,3,5(10)-triene-1,4-diol.

The instant 1,3- and 1,4-bis-(lower alkanoates) can be obtained by treating the corresponding diol with an excess quantity of the lower alkanoic acid anhydride in pyridine. Typically, estra-1,3,5(10)-triene-1,3-diol is allowed to react with excess propionic anhydride in pyridine, resulting in 1,3-dipropionoxyestra-1,3,5(10)-triene. On the other hand, the reaction of the instant diols with one molecular equivalent of the acylating agent produces the corresponding 3- or 4-mono-(lower alkanoate). For instance, treatment of estra-1,3,5(10)-triene-1,4-diol with one molecular equivalent of acetic anhydride in pyridine yields 4-acetoxyestra-1,3,5(10)-trien-1-ol.

When the instant bis-(lower alkanoates) are treated with dilute hydrochloric acid in methanol under less strenuous conditions than those mentioned supra, the instant 1-mono-(lower alkanoates) are obtained. For example, 1,4-dipropionoxyestra-1,3,5(10)-triene in methanol is treated with dilute hydrochloric acid at the reflux temperature for a short time then at room temperature for a longer period, to afford 1-propionoxyestra-1,3,5(10)-trien-4-ol.

The compounds of this invention are useful as a result of their valuable pharmacological properties. They have, for example, the capacity to decrease the serum concentration of cholesterol and the corresponding cholesterol/phospholipid ratio without at the same time producing the potent estrogenic side-effects characteristic of prior art compositions adapted to regulation of cholesterol metabolism.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight unless otherwise noted.

Example 1

To a suspension of 10 parts of estra-1,3,5(10)-trien-3-ol in 100 parts of glacial acetic acid is added portionwise over a period of about 5 minutes, 34.6 parts of lead tetraacetate. The resulting solution is stirred for about one hour longer, kept at 20–30° by means of a water bath, then diluted with water to approximately 1500 parts by volume and extracted with chloroform. The chloroform solution is washed with water, dried over anhydrous sodium sulfate, and evaporated to dryness in vacuo. The residue is adsorbed on magnesiated silica and eluted with benzene. The material, recovered by concentration of the eluate, is recrystallized from hexane to afford pure 10β-acetoxyestra-1,4-dien-3-one, M.P. 194–197°;

$[\alpha]_D = -70.9°$ (chloroform)

Example 2

A solution of 4 parts of 10β-acetoxyestra-1,4-dien-3-one in 100 parts by volume of saturated methanolic potassium bicarbonate is heated at reflux, under nitrogen, for about 30 minutes. The reaction mixture is diluted with water and extracted with a chloroform-ethyl acetate solution. The organic extract is washed with water, dried over anhydrous sodium sulfate, and evaporated to dryness in vacuo. The residual material is adsorbed on magnesiated silica, and the column eluted successively with benzene and 5% ethyl acetate in benzene. The eluates are combined and the solvent evaporated. The resulting residue is recrystallized from ethyl acetate to yield 10β-hydroxyestra-1,4-dien-3-one, M.P. 175–178°; $[\alpha]_D = -59.6°$ (chloroform).

Example 3

A stirred suspension of 1.7 parts of 10β-acetoxyestra-1,4-dien-3-one in 27 parts of acetic anhydride is treated with 0.5 part of concentrated sulfuric acid. Stirring is continued until the mixture becomes homogeneous, then the resulting solution allowed to stand at room temperature for about 2 hours. This reaction mixture is neutralized with aqueous potassium bicarbonate, then extracted with a chloroform-ethyl acetate solution. This organic extract is washed with water, dried over anhydrous sodium sulfate, and concentrated to dryness in vacuo. The residue is adsorbed on silica gel, then eluted with benzene and 5% ethyl acetate in benzene. The eluates are combined, evaporated to dryness and the resulting residual material recrystallized from methanol to produce 1,3-diacetoxyestra-1,3,5(10)-triene, M.P. 141–143°; [α]_D = +153.8° (chloroform).

*Example 4*

The reaction of one part of 10β-hydroxyestra-1,4-dien-3-one with 5 parts of acetic anhydride and 0.5 part of concentrated sulfuric acid is carried out according to the procedure described in Example 3.

In this instance, the product is eluted from the silica gel chromatographic column with 1–10% ethyl acetate in benzene. Recrystallization of the crude product from methanol results in pure 1,4-diacetoxyestra-1,3,5(10)-triene, M.P. 154–157°; [α]_D = +182.9° (chloroform).

*Example 5*

A mixture of 1.2 parts of 1,3-diacetoxyestra-1,3,5(10)-triene, 80 parts of methanol, 20 parts of water, and 3 parts of concentrated hydrochloric acid is heated on the steam bath, with stirring, for about one hour, then stirring continued at room temperature for about 16 hours. The solvent is removed by means of a stream of nitrogen and the resulting residue diluted with water, then extracted with a chloroform-ethyl acetate solution. The organic extract is washed with water, dried over anhydrous sodium sulfate, and concentrated to dryness at reduced pressure. The remaining material is adsorbed on silica gel, then eluted with 85% benzene in hexane. The crude product obtained from this eluate is recrystallized from methanol to yield 1-acetoxyestra-1,3,5(10)-trien-3-ol, M.P. 279–284°; [α]_D = +115.5° (dioxane).

The substitution of an equivalent quantity of 1,4-diacetoxyestra-1,3,5(10)-triene in the process of this example results in 1-acetoxyestra-1,3,5(10)-trien-4-ol.

*Example 6*

A mixture of 3 parts of 1,4-diacetoxyestra-1,3,5(10)-triene, 200 parts of methanol, 7 parts of concentrated hydrochloric acid, and 50 parts of water is heated at reflux, with stirring, for about 16 hours. The solvent is evaporated and the remaining mixture diluted with water, then extracted with a chloroform-ethyl acetate solution. The organic layer is washed with water, dried over anhydrous sodium sulfate, and evaporated to dryness in vacuo. This residue is chromatographed on silica gel and eluted with 10% ethyl acetate in benzene to afford estra-1,3,5-(10)-triene-1,4-diol. This substance exhibits infrared maxima at 3.00, 3.15, 6.21, 6.28, and 12.43 microns.

By substituting 3 parts of 1,3-diacetoxyestra-1,3,5(10)-triene in the herein-described process, estra-1,3,5(10)-triene-1,3-diol is obtained.

*Example 7*

A mixture of one part of estra-1,3,5(10)-triene-1,4-diol, 15 parts of propionic anhydride, and 20 parts of pyridine is allowed to stand at room temperature for about 15 hours, then diluted with water and extracted with benzene. The benzene layer is washed successively with dilute hydrochloric acid and water, dried over anhydrous sodium sulfate, and evaporated to dryness in vacuo to yield 1,4-dipropionoxyestra-1,3,5(10)-triene. This diester displays infrared maxima at 5.68, 6.21, 6.34, and 8.37 microns.

The substitution of one part of estra-1,3,5(10)-triene-1,3-diol in this process results in 1,3-dipropionoxyestra-1,3,5(10)-triene.

*Example 8*

A mixture of 2.7 parts of estra-1,3,5(10)-triene-1,4-diol, one part of acetic anhydride, and 20 parts of pyridine is allowed to stand at room temperature for about 15 hours, then diluted with water and extracted with benzene. The organic layer is washed successively with dilute hydrochloric acid and water, dried over anhydrous sodium sulfate, and chromatographed on silica gel. Elution with a benzene-hexane solution affords 4-acetoxyestra-1,3,5(10)-triene-1-ol, which possesses maxima in the infrared at 2.92, 5.78, 6.16, 6.32, 8.05, and 12.45 microns.

By substituting 2.7 parts of estra-1,3,5(10)-triene-1,3-diol and 1.3 parts of propionic anhydride for estra-1,3,5-(10)-triene-1,4-diol and acetic anhydride, respectively, in this process, 3-propionoxyestra-1,3,5(10)-trien-1-ol is obtained.

*Example 9*

A mixture of 2 parts of 1,4-dipropionoxyestra-1,3,5-(10)-triene and 125 parts of methanol is treated with 30 parts of water and 4.5 parts of concentrated hydrochloric acid, and the resulting mixture stirred and heated at reflux for about one hour. This reaction mixture is allowed to cool, then stored at room temperature for about 16 hours. The solvent is removed by evaporation and the residue treated with water, then extracted with chloroform-ethyl acetate. The organic solution is washed with water, dried over anhydrous sodium sulfate, and concentrated to dryness in vacuo. Purification of the residue by adsorption on silica gel and elution with benzene followed by recrystallization from methanol results in 1-propionoxyestra-1,3,5(10)-trien-4-ol. This monoester exhibits infrared maxima at 2.92, 5.68, 6.17, 6.27, 8.38, and 12.47 microns.

What is claimed is:

1. A member selected from the group consisting of compounds of the structural formulae

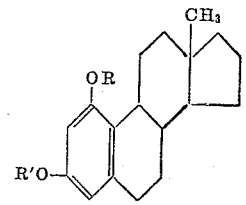

and

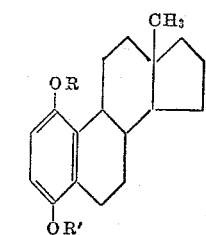

wherein R and R' are selected from the group consisting of hydrogen and lower alkanoyl radicals.
2. 10β-acetoxyestra-1,4-dien-3-one.
3. 10β-hydroxyestra-1,4-dien-3-one.
4. 1,3-diacetoxyestra-1,3,5(10)-triene.
5. 1,4-diacetoxyestra-1,3,5(10)-triene.
6. 1-acetoxyestra-1,3,5(10)-trien-3-ol.

References Cited in the file of this patent

UNITED STATES PATENTS 2,861,086     Jiu  ---------------- Nov. 18, 1958
2,910,486     Jiu  ---------------- Oct. 27, 1959